UNITED STATES PATENT OFFICE.

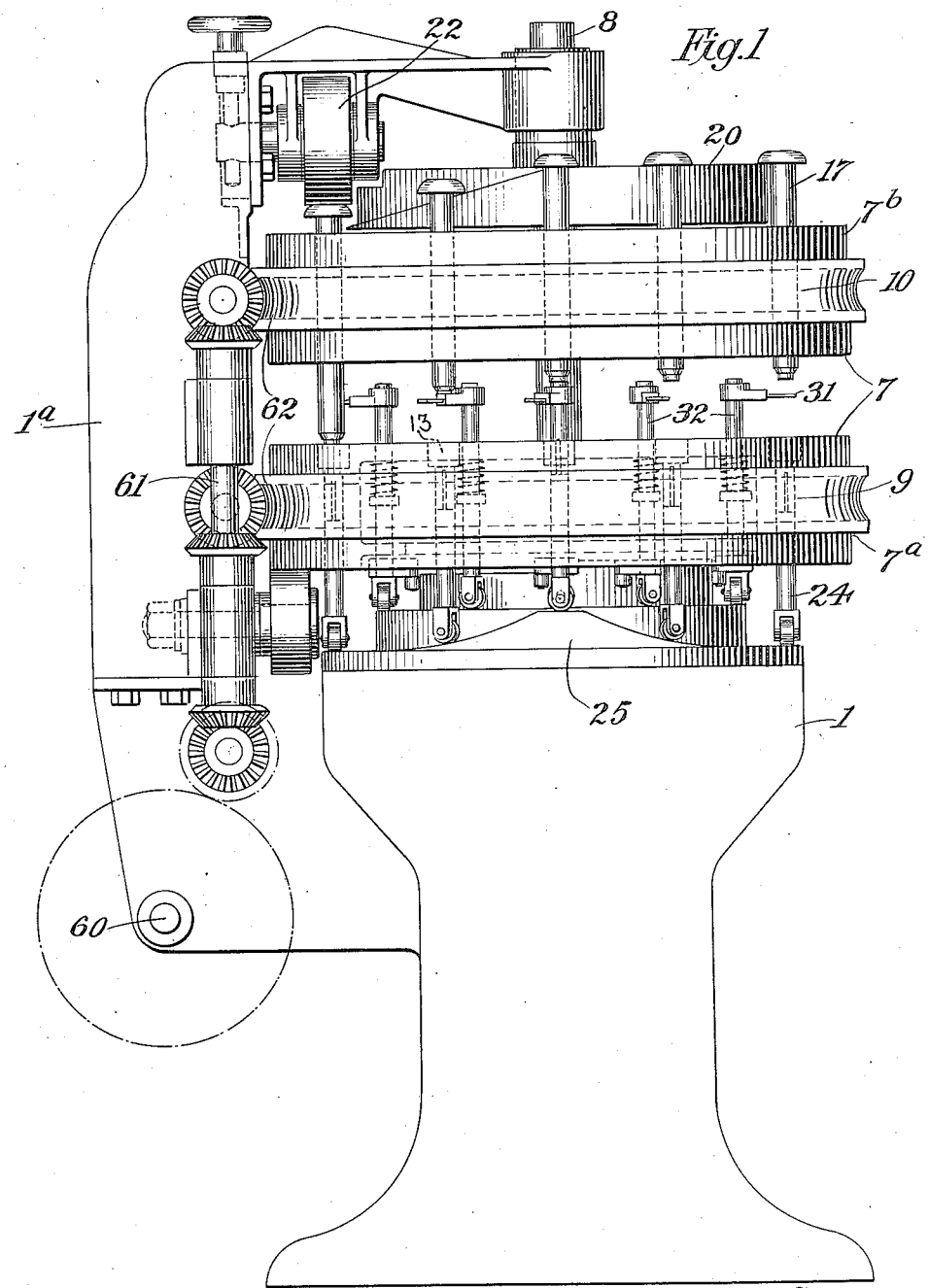

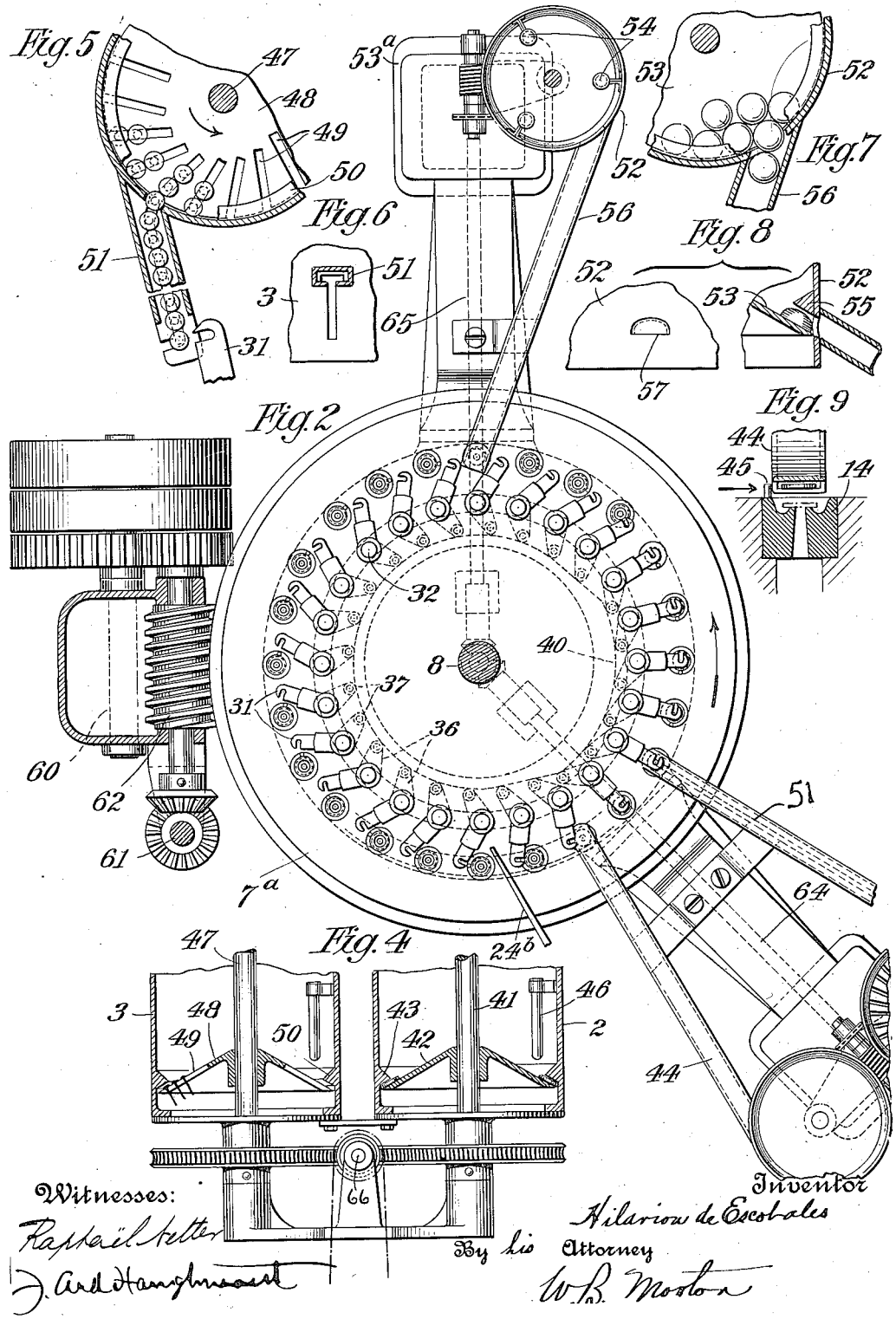

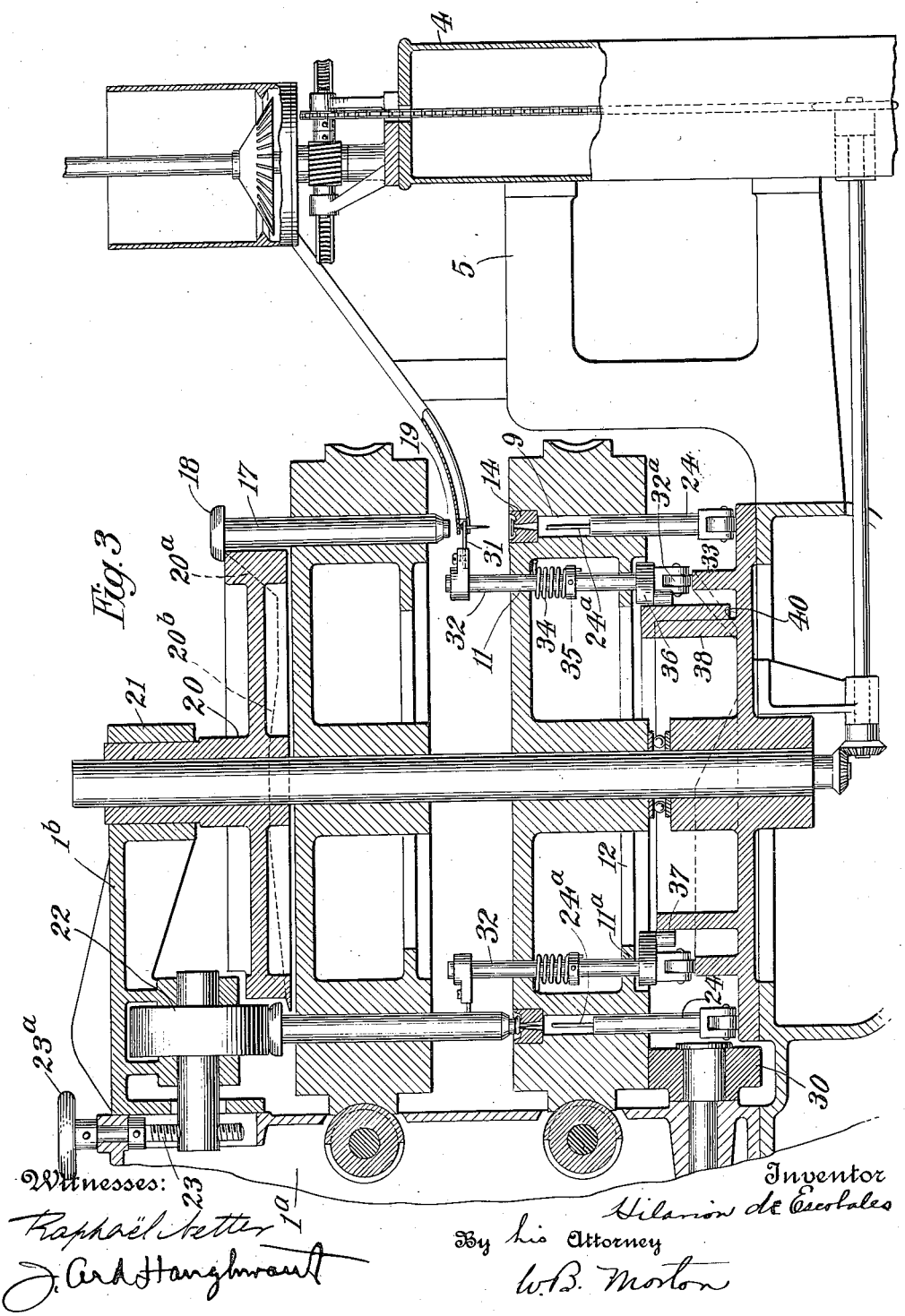

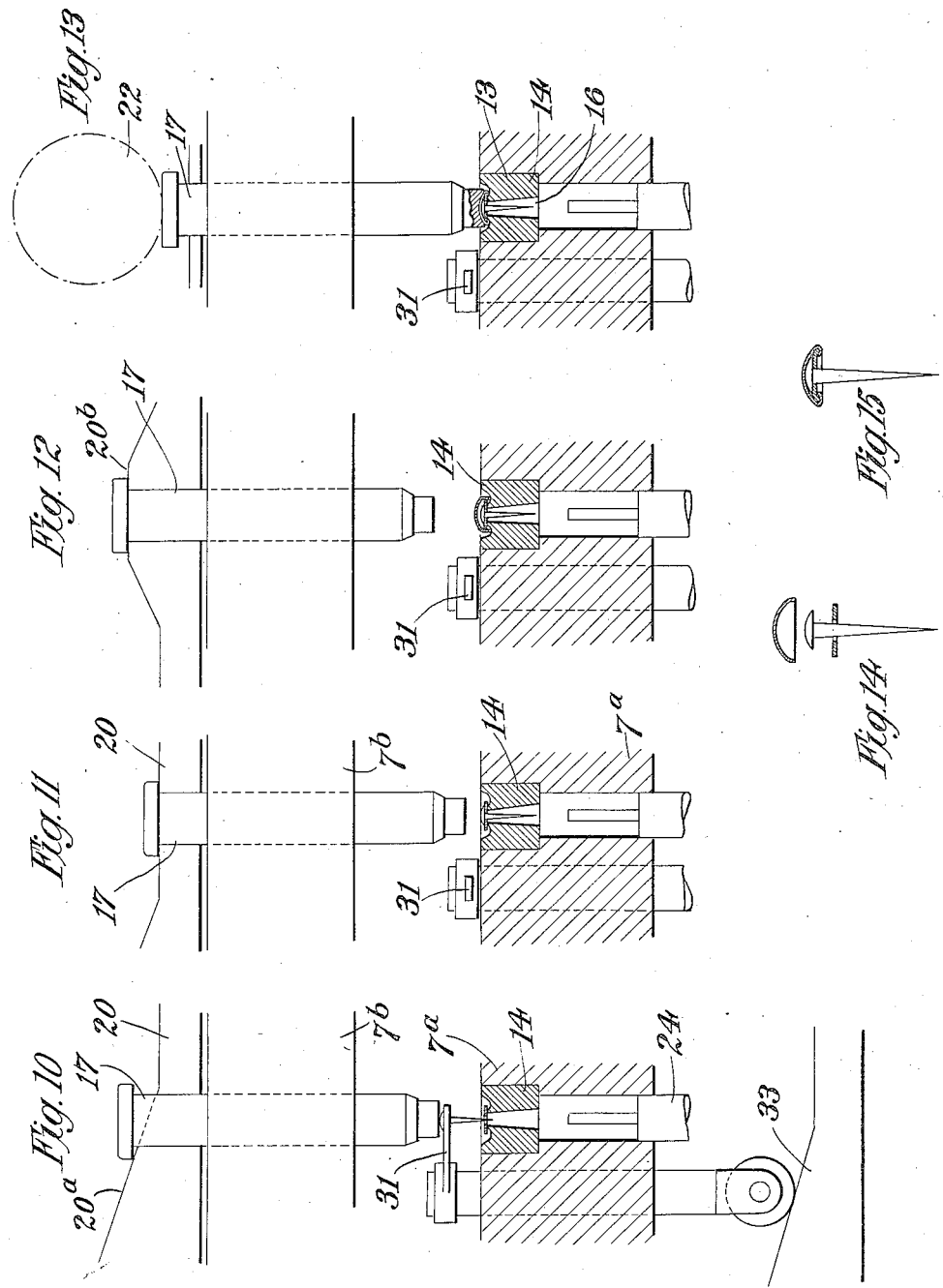

HILARION DE ESCOBALES, OF TOMPKINSVILLE, NEW YORK.

NAIL-CAPPING MACHINE.

1,272,634.
Specification of Letters Patent.
Patented July 16, 1918.

Application filed March 15, 1915. Serial No. 14,375.

*To all whom it may concern:*

Be it known that I, HILARION DE ESCOBALES, a citizen of the United States, and a resident of Tompkinsville, county of Richmond, State of New York, have invented new and useful Improvements in Nail-Capping Machines, of which the following is a specification.

This invention relates to machines for making brass head nails or "saddle nails" of the type consisting of a wrought iron nail having a rounded brass head crimped over the head of the nail and under the edges of a washer surrounding the shank of the nail beneath the head.

One object of the invention is to produce a machine of this character which is entirely automatic in its operation, receiving the three parts of which the nail is composed in suitable hoppers in bulk and delivering the completed nail from the machine without manual operation of any kind.

A further object of the invention is to provide a machine of this class in which the power driven parts are continuously driven as distinguished from the intermittent type of machine, and in which the sequence of operation of the various working parts is produced by their engagement with stationary cams adjacent their path of movement, thereby obviating the use of intricate power transmitting connections and reducing the number of working parts of the machine to a minimum.

A further object of the invention is to produce a machine of this class which may be operated at sufficient speed without noise or destructive vibration, but to have a large output in proportion to the cost of the machine and the power required for its operation.

Further objects of the invention reside in various improvements in the specific mechanism of the machine as will be hereinafter described and pointed out in the appended claims.

In the accompanying drawings and following specification, I have illustrated and described a preferred design of machine embodying my invention, but it is to be understood that my invention is not limited to the construction disclosed except as determined by the scope of the appended claims. In said drawings, Figure 1 is a side elevation of the main portion of the machine;

Fig. 2 is a plan view partly in section showing the feed hoppers and the upper face of the lower carrier;

Fig. 3 is a vertical sectional view of the main portion of the machine;

Fig. 4 is a vertical sectional view of the hoppers for the nails and washers;

Figs. 5 to 9 inclusive are detail views of the feeding devices for the several parts of the nails;

Figs. 10 to 13 inclusive are diagrammatic views showing the successive steps in the capping operation; and Figs. 14 and 15 are sectional views of the nail produced from the machine before and after the capping operation.

Referring to the drawings 1 indicates the frame or pedestal of the machine proper on which is supported the operating parts of the machine and which also partially supports the feed hoppers for the washers, nails and heads.

The machine proper comprises a driven carrier 7 mounted on the vertical shaft 8 centrally supported in a suitable bearing on the pedestal 1. The carrier comprises upper and lower carrier disks or wheels attached to the shaft and spaced apart a distance somewhat greater than the length of the nails operated upon. The lower wheel 7ª is provided around its circumference with a plurality of vertical holes 9 extending through the wheel. The holes here shown are 24 in number although the number may obviously be varied more or less in accordance with the desired capacity of the machine. The upper carrier wheel 7ᵇ is provided with a corresponding series of similar holes 10 registering with the holes of the lower wheel carrier, the two carriers being fixed to the shaft and driven in unison to maintain the holes at all times in registration.

The holes 9 are enlarged or counterbored in the upper face of the wheel as indicated at 13 to form seats for the hardened steel shaping dies 14 by means of which the edges of the brass head are crimped under the edges of the washer beneath the nail head. The dies are made removable so that different shapes may be provided for different styles of nails and also so they may be readily replaced in case of wear or breakage. Each die comprises, as more particularly shown in Figs. 10 to 13 a block 14 adapted to fit the counter-bore in the carrier wheel and having a central perforation 16 for receiving the point of the nail. The upper face of the block is shaped to provide a suitable surface for crimping the edges of the brass head, the center of the die being slightly elevated for turning the edges of the head upwardly against the under face of the washer.

In the holes 10 in the upper carrier the punches 17 are mounted which coöperate with the dies in shaping the brass heads. Each punch comprises a shank terminating at its upper end in an enlarged rounded head 18 and provided at its lower end with a seat for the nail engaging tool 19 which projects slightly below the shank and has formed in its lower end a recess shaped to fit the upper face of the brass heads of the nails. The carrier shaft is continuously rotated and each punch is forced downwardly into the die once on each revolution of the carrier, and then raised to permit the die to receive the parts of the nail to be produced on the next descent of the punch. The punches are operated by means of a stationary cam 20 mounted between the upper carrier and the upper journal 21 of the carrier shaft. The cam is substantially circular and of a diameter to project under the edge of the head of the punch. The upper face of the cam is cut away as shown more particularly at the left as the machine is viewed in Fig. 1, the thinnest portion of the cam being at the point nearest adjacent the vertical bracket $1^a$ of the frame which supports the upper shaft bearing. From this point the upper face of the cam is inclined upwardly throughout the quadrant at the front of the cam so that the punches 17 will be lifted clear of the completed nails before the dies reach the ejecting position as will be later described. Continuing around the cam in the direction of the movement of the carrier it will be seen that the upper face of the cam continues at its greatest elevation until a point beyond the nail feeding position and then inclines downwardly as shown in Fig. 3 at $20^a$ to allow the punches to follow the nails into the dies. The surface of the cam then rises slightly at the cap feeding position as shown at $20^b$ and then inclines downwardly to its thinnest portion at the crimping position.

To positively depress the punch with sufficient force to crimp the head on the nail, I provide a wheel or roller 22 supported in horizontal journals in the arm of the bracket $1^a$ above the path of movement of the punches over the thinnest portion of the cam, at which point the upper surface of the cam is low enough to permit sufficient movement of the punch to effect the proper crimping of the brass head on the nails and washers assembled in the die. The head of the punch is rounded as shown in the drawing, and as the punch is carried under the fixed roller 22 it is depressed with a powerful and progressive wedging action which causes the edges of the brass head to be crimped by the curved face of the die under and upwardly against the washer beneath the head of the nail. In order to adjust the position of the roller to secure the desired movement of the punch, the horizontal arm $1^b$ of the bracket $1^a$ which supports the shaft of the roller 22 is mounted for vertical adjustment in suitable slideways in the bracket $1^a$. Means are provided to adjust the arm consisting of a screw 23 with hand wheel $23^a$ rotatably supported in the bracket and threaded through the end of the shaft of the roller. The range of adjustment of the roller is very slight and is provided merely to take up wear of the parts and to accommodate slight differences which may occur in the different runs of the nails, washers and caps.

To support the lower carrier against deformation under the pressure of the die I provide a roller 30 supporting the edge of the carrier adjacent the bracket $1^a$, the roller being mounted on a stationary stub shaft set in the bracket $1^a$ and preferably having the portion on which the roller is mounted slightly eccentric to permit a small adjustment of the roller.

After the heads are crimped on the nail as described the completed nails are ejected from the die so that when the dies reach the feeding and assembling devices they will be free to receive fresh parts. The ejection of the nails is accomplished by means of a vertical moving rod 24 mounted in the holes 9 below the dies and each provided at its upper end with a reduced extension $24^a$ adapted to pass upward through the bore of the die and engage the nail point and lift the nail so that it will fall clear of the carrier. The rods 24 are actuated by a stationary cam 25 mounted on the upper face of the pedestal, and provided with oppositely inclined surfaces to raise the ejector and allow it to immediately descend to clear the die. If desired a suitable receptacle may be arranged to receive the ejected nails which are directed away from the carrier by a stationary outwardly inclined arm $24^b$, or a carrier may be provided to carry them away from the machine.

The lower carrier is provided with a second series of holes extending through the carrier, each hole being arranged in a radial line extending between the centers of the holes 9 and the center of rotation. The lower carrier is solid at its periphery where the outer series of holes is located, the solid periphery being connected to the hub of the wheel by a continuous web forming the upper surface of the wheel. The inner series of holes 11 is located in the web within the solid periphery and corresponding holes 11$^a$ are formed in the flange 12 at the lower edge of the wheel.
A series of nail receiving arms 31 are mounted in the upper ends of rods 32 which are supported for vertical movement in the holes 11, 11$^a$, in the upper web and lower flange of the lower carrier. The rods 32 are raised and lowered once in each rotation of the carrier to drop the nail into the die by means of a stationary cam ring 33 attached to the upper face of the pedestal 1 and having the major portion of its surface elevated to maintain the arms in their raised position, but provided with a double inclined depression at the point in the cam over which the nail holders pass after leaving the nail feeding chute. The rods may be allowed to drop of their own weight, but I prefer to provide a spring 34 arranged between the web of the carrier wheel and the collar 35 to positively hold the cam engaging roller 32$^a$ in the lower end of the rod against the face of the cam.

Each nail holding arm comprises a flat outwardly projecting arm extending over the adjacent die and having a vertical slot in its advancing edge adapted to engage the shank of the nail in the end of the nail chute and withdraw the nail from the chute as will be described.

Means are also provided to turn the rods 32 of the nail holding arms through a sufficient angle for the arms to clear the heads of the nail after the nails are deposited in the die and before the arms are raised by the upwardly inclined face of the cam 33. To this end the lower ends of the rods are provided with arms 36 in which are seated crank pins 37 provided with rollers operating against a circumferential cam 40 attached to a ring 38 supported on the top of the pedestal 1 within and above the cam ring 33. The roller is held in engagement with the cam by means of the spring 34 whose opposite ends are attached respectively to the web of the carrier and the ring 35 so as to give a torsional movement to the rods as well as to depress them. The cam 40 is attached to the ring 38 at the portion adjacent the cutaway surface of the cam 33 so that the rods are turned to bring the arms 31 over the dies to receive the nails, so that as the rods are depressed by the springs 34 as they move down the inclined portion of the cam 33, the nails will be lowered into the die. Before the upward incline of the cam 33 commences the rollers on the crank pins 37 run off the cam 40 allowing the nail holding arms to turn from under the heads of the nails.

To assist in the proper insertion of the nails in the dies the cam 20 for the punches is provided with the depression 20$^b$ previously described corresponding in position to the downwardly inclined portion of the cam 33 to allow the weight of the punches to rest on the heads of the nails as they are deposited in the dies.
The washers are fed into the dies before the nails are deposited by the nail holding arms so that the washers will be assembled on the nails beneath the heads. After the nails are arranged in the dies, the dies pass the cap feed by which a cap is deposited with its open side down over the nail head and washer during the temporary elevation of the punch as described.

The hopper 2 for the washers and the hopper 3 for the nails are both supported on the top of a pedestal 4 connected to the main frame 1 by the bracket 5 and also provided with an auxiliary base. Each hopper comprises an open metal cylinder stationarily supported at the top of the pedestal and provided with a central vertical shaft which is continuously rotated. The shaft 41 of the washer hopper carries near its lower end a cone 42 whose outer edge substantially fills the hopper with just enough clearance to permit its free rotation. Overlying the edge of the cone is a flange 43 formed on the inner wall of the hopper and having its lower face parallel with the face of the cone and spaced from the face of the cone a distance just sufficient to permit the washers to lie flat on the cone.

A slot is provided in the wall of the hopper and at one side thereof coincident with the space between the cone and flange, and attached to this side of the hopper at the slot is a metal guide chute 44 as shown in Figs. 2 and 9 which curves downwardly to the carrier 7 of the machine so that the washers will move down the guide chute of their own weight. The guide chute joins the hopper at its end, the washers being received through a slot in the end of the chute which registers with the slot in the wall of the hopper, while at the lower end the washers are delivered through a slot in the side wall of the chute by means of pins 45 set in the face of the carrier at the rear edges of the dies in the direction of their advance. The bottom face of the guide chute 44 is also slotted in the line of the path of travel of the pins 45 so that each pin ejects one washer from the guide chute allowing it to drop in the die.
The continuous rotation of the cone 42 keeps the washers agitated in the hopper keeping the space between the flange and the edge of the cone filled with washers ready to drop into the guide chute. To assist in the agitation of the washers there may be provided a series of fixed bars or baffles 46 overlying the face of the cone.

The shaft 47 of the nail hopper 3 has attached near its lower end a cone 48 similar to the cone 42 except that it is provided with a series of slots 49 inclined away from the radial in the direction of rotation of the cone as indicated by the arrow in Fig. 5. Overlying the edge of the cone is a flange 50 spaced from the face of the cone a distance slightly greater than the thickness of the nail heads. The nail hopper may also be provided with spaced baffles to assist in stirring up the nails so that the slots 49 will be kept filled with nails having their shanks projecting through the slots and supported in the cone by their heads overlapping the edges of the slots.

The side wall of the hopper is provided with an opening sufficient in extent to permit the nails to pass through the opening and into the nail guide chute 51 which receives the heads of the nails, as shown more particularly in Figs. 5 and 6. The nail guide chute extends downwardly to a position over the carrier where its closed end terminates immediately above the path of movement of the nail supporting arm 31. As each arm 31 passes under the chute, the slot in its advancing edge engages the shank of the nail on the end of the chute immediately below its head, and carries the nail out of the end of the chute, the side wall of the chute and a portion of the bottom wall being cut away to permit the egress of the nail. The nail guide chute is arranged beyond the washer chute in the direction of travel of the carrier so that the washer will be positioned in the die before the nail is fed into the die in the manner hereinafter described.

Brass caps for the nails are fed into the machine from the hopper 52 supported on the pedestal 53ª at the side of the machine between the nail feeding hopper and the bracket 1ª. The hopper 52 is similar to the washer hopper and contains a central shaft with the cone 53 for keeping the caps in motion.

Fixed baffles 54 are also provided and a flange 55 overhangs the edge of the cone 53 to permit the caps to reach the wall of the hopper only when flat on the face of the cone. A hole is provided in the wall of the hopper at one side which communicates with the guide chute 56 similar to the chute provided for the washers and leading to a point immediately above the path of travel of the dies in the carrier whereby the caps will be ejected one by one by the pins 45 in the same manner as the washers.

As the washers are the same on both sides their arrangement in the dies is immaterial, but the caps must necessarily be arranged with the open side down in order to be crimped on the heads of the nails. To insure that the caps in the feed chute are all arranged the same way, the holes 57 in the wall of the hopper leading to the chute is of a shape to permit egress of the caps only when arranged face down, that is, the hole is the same shape as the vertical section of the cap with the square corners down. Should the cap attempt to pass through the hole in an inverted position, it will not pass into the hole sufficiently to be stuck but will be merely carried along with the other caps on the face of the revolving cone.

The machine is driven from a main driving shaft 60 having the usual fast and loose pulleys and driving through an appropriate gearing and vertical shaft 61 mounted in the bracket 1ª. Through this shaft each section of the carrier 7 is directly driven by worm gears 62 as clearly shown in the drawing. The cones of the various hoppers are directly and continuously driven from the shafting of the machine proper through intermediate horizontal shafts 64. 65 extending to points respectively under the two hopper pedestals, which shafts are connected by suitable belts with horizontal shafts at the top of the hopper pedestals. The horizontal shaft 66 for the nail and washer hoppers is provided at the sides of the pulley with a worm connected by suitable gearing with the vertical shafts 41 and 47. The shaft of the cone 53 in the hopper for the caps is similarly driven.

From the above description it will be observed that my improved machine is entirely automatic in operation, requires practically no attention on the part of the operator and embodies no directly driven parts except the carrier and the agitator for the feed hoppers, and these parts are continuously driven at a moderate speed. The timed operation of the various devices supported by the carrier is secured entirely by stationary cams which by proper construction will last the life of the machine. The only part of the mechanism whose operation must be so accurate as to be influenced by the wear of its operating cam is the crimping plunger, and the adjustment of the stroke of this part is provided for in the vertically adjustable upper bracket of the machine.

While I have shown and described what I believe to be a preferred embodiment of my invention in the matter of simplicity and durability of construction, ease of operation, etc., it will be obvious that the details of such construction may be more of less modified within the scope of the claims without departure from the principle of construction or material sacrifice of the advantages of the preferred design.

Having thus described my invention, what I claim and desire to secure by Letters Patent is:—

1. In a nail capping machine, the combination of coöperating crimping devices, means for feeding and assembling a washer, a nail and a cap in said crimping devices and means for operating said devices to crimp the edges of the cap around the edges of the washer beneath the head of said cap.

2. In a nail capping machine the combination of a carrier, means for feeding and assembling a nail and cap in said carrier during the movement of said carrier and means for crimping the edges of the cap beneath the head of said nail.

3. In a nail capping machine the combination of a continuously moving carrier, means for feeding and assembling a nail and a cap in said carrier and means for crimping the edges of the cap beneath the head of said nail and during the movement of said carrier.

4. In a nail capping machine, the combination of a carrier, a series of crimping dies in said carrier, means for feeding and assembling a nail and a cap in each of said dies during the movement of said carrier, and means for pressing said nails and caps into said dies to crimp the caps on said nails.

5. In a nail capping machine, the combination of a carrier, a series of crimping dies in said carrier, means for feeding and assembling a nail and a cap in each of said dies, a series of plungers supported by said carrier, and means for actuating said plungers to crimp said caps on said nails in said dies.

6. In a nail capping machine, the combination of a carrier, a series of crimping dies and a series of plungers supported by said carrier, means for feeding and assembling a nail and a cap in each of said dies, and depressing said plungers to crimp said caps on said nails.

7. In a nail capping machine, the combination of a continuously moving carrier, a series of dies in said carrier, a series of plungers freely mounted in said carrier for movement toward and from said dies, means for feeding and assembling a nail and a cap in each of said dies and stationary cams in the path of movement of said plungers for moving them into and out of said dies to effect the crimping of said caps on the heads of said nails.

8. In a nail capping machine, the combination of a continuously moving carrier, a series of dies in said carrier, a series of plungers freely mounted in said carrier for movement toward and from said dies, means for feeding and assembling a nail, a washer and a cap in each of said dies and stationary cams in the path of movement of said plungers for moving them into and out of said dies to effect the crimping of said caps on the washers beneath the heads of said nails.

9. In a nail handling machine, the combination of a carrier provided with a series of nail receiving cavities, means for depositing nails in said cavities comprising nail holding arms mounted for vertical and oscillating movement adjacent said carriers and means for lowering said arms to position said nails and then swinging said arms to clear the heads of said nails.

10. In a nail handling machine, the combination of a carrier provided with a series of nail receiving cavities, means for depositing nails in said cavities comprising nail holding arms mounted for vertical and oscillating movement adjacent said carriers, means for lowering said arms to position said nails and then swinging said arms to clear the heads of said nails, and means for automatically feeding a single nail into each of said nail holding arms.

11. In a nail capping machine, the combination of a continuously rotating carrier having upper and lower sections, a series of crimping dies in said lower section, coöperating punches in said upper section, means for successively feeding washers, nails, and caps between said sections above said dies and for assembling one of each in each die, means for successively actuating the plungers to crimp the caps and means for ejecting the finished nails from the dies.

12. In a nail-capping machine the combination of a continuously rotating carrier having dies for applying the caps to the nails, said dies being arranged in an annular series around the periphery of said carrier and means for feeding the caps to the carrier comprising a chute for successively advancing the caps to a position over the path of movement of the dies, and a series of trips on the face of the carrier adjacent each die adapted to engage the most advanced cap in the chute and deliver it to the die.

13. In a nail-capping machine for producing a nail having a washer beneath its head and a cap crimped over the nail head and the washer, the combination of a rotating carrier having a series of dies for receiving the parts and effecting crimping operation, of means for feeding the parts to the dies comprising a chute for the washers terminating in a position over the path of movement of the dies, a chute for the caps terminating in a position over the path of movement of the dies, a nail-feed intermediate the two chutes in the direction of rotation of the carrier and a series of trips arranged one adjacent each die, and positioned to first engage and direct a washer into a die as it passes under the washer chute, and thereafter similarly engage and feed a cap into the die.

14. In a nail-capping machine the combination of a continuously rotating carrier, a series of crimping dies arranged around the periphery of the carrier, a series of coöperating plungers also supported in the carrier, nail-positioning devices for directing the nails into the dies supported in the carrier, one for each said die, and means for operating said plungers and positioning devices consisting of stationary cams arranged in the path of travel of said plungers and positioning devices, respectively.

15. In a nail-capping machine the combination of a continuously rotating carrier, a series of crimping dies arranged around the periphery of the carrier, a series of coöperating plungers also supported in the carrier, nail-positioning devices for directing the nails into the dies supported in the carrier, one for each said die, nail-ejectors carried by each said die, and means for operating said plungers, positioning-devices and ejectors consisting of stationary cams arranged in the path of travel of said plungers, positioning devices and ejectors, respectively.

Signed at New York, in the county of New York and State of New York, this 25th day of February, 1915.

HILARION DE ESCOBALES.

Witnesses:
THOMAS E. McENTEGART,
ARTHUR G. H. POWER, Jr.